J. H. NICHOLLS.
CLUTCH MECHANISM.
APPLICATION FILED JULY 29, 1914.

1,246,309.

Patented Nov. 13, 1917.

Witnesses:
Herbert Langner
William Heard

John Herbert Nicholls,
Inventor,
by Lawrence Langner
Attorney.

J. H. NICHOLLS.
CLUTCH MECHANISM.
APPLICATION FILED JULY 29, 1914.

1,246,309.  Patented Nov. 13, 1917.
2 SHEETS—SHEET 2.

Witnesses
Herbert Langner.
William Heard

John Herbert Nicholls.
Inventor
by Lawrence Langner
Attorney.

UNITED STATES PATENT OFFICE.

JOHN HERBERT NICHOLLS, OF ONEHUNGA, NEAR AUCKLAND, NEW ZEALAND.

CLUTCH MECHANISM.

1,246,309.  Specification of Letters Patent.  Patented Nov. 13, 1917.

Application filed July 29, 1914. Serial No. 853,987.

*To all whom it may concern:*

Be it known that I, JOHN HERBERT NICHOLLS, a subject of His Majesty the King of the United Kingdom of Great Britain and Ireland, resident of Onehunga, near the city of Auckland, in the Provincial District of Auckland and Dominion of New Zealand, have invented a new and useful Improved Clutch Mechanism, of which the following is a specification.

This invention relates to clutching mechanism for clutching and unclutching rotary parts, so as to cause the driving part to rotate independently of or in conjunction with the driven part, as may be desired.

The chief object of the invention is to provide a clutching mechanism, in which operative connection between the driving and driven parts is effected through the intervention of a number of radial toothed sections, which are normally maintained against flat surfaces of the driving part and adapted to be radially expanded by the longitudinal displacement of a collar or member on the driving part to cause such sections to enter into toothed engagement with internal teeth provided on the driven part. The longitudinally displaceable collar on the driving part is preferably formed with tapered projections, which are adapted to engage between the radial sections and expand the same to effect the locking of the driven part and the radial sections securely to the driving part.

Referring to the drawings accompanying this specification,

Figure 1:
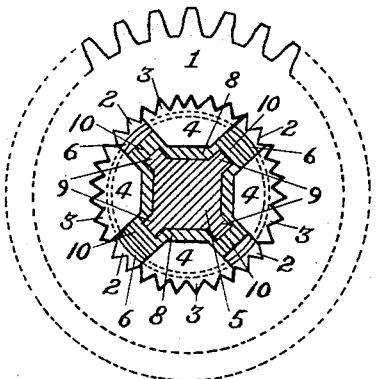
Figure 1 is a sectional view of a gear wheel fitted with the improved form of clutch.
Figure 2:
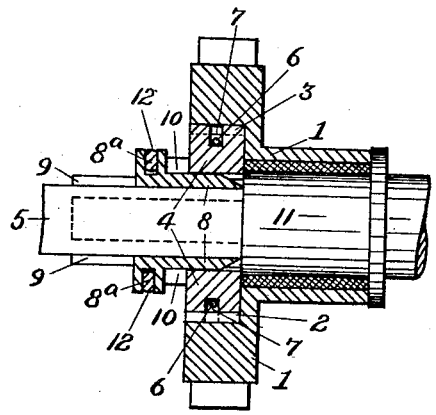
Fig. 2 is a longitudinal sectional elevation of same.

The gear wheel 1 or the pulley or the like in conjunction with which the clutch operates is formed with an inner circle of teeth 2 (Figs. 1 and 2). These inner teeth 2 are V-shaped or similarly formed to facilitate the meshing therewith of the correspondingly formed teeth 3 of the radial toothed sections 4. The shaft 5 is flat sided except at its bearing parts or where the pulley or wheel is mounted thereon. The toothed sections 4 are arranged around the shaft 5 inside the wheel 1, there being one section 4 to each side of the shaft. A circular spring 6 lying in grooves 7 in the outer edges of the sections 4 keep the latter normally contracted around the flat sides of the shaft 5, and the teeth 3 thereof out of engagement with the inner teeth 2. (In Figs. 1 and 2 the wheel 1 is shown clutched to the shaft 5).

Figure 3:
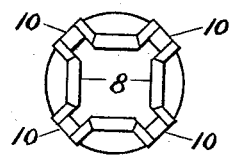
Fig. 3 is an end view of the sliding collar used in Figs. 1 and 2.
Figure 4:
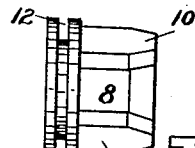
Fig. 4 is a side view of the collar as shown in Fig. 3.

To cause the engagement of the teeth 3 of the radial sections 4 with the inner teeth 2 of the wheel 1 the sections 4 are caused to expand by the end thrust or movement of the collar 8 slidably mounted on the shaft 5. The collar 8 works on keys 9 on the shaft 5 and has formed at each corner a key shaped projection 10, the end of the collar and the ends of the projections 10 being tapered as illustrated in Figs. 2, 3 and 4. The sections 4 in their unexpanded position rest on the shaft 5 with their narrowest portions between the keys 9, and on the tapered end of the collar 8 being forced between them and the shaft, ride up on to the collar 8 between the key projections 10 therefrom which latter act as guides for the sections 4 during the clutching and unclutching movements.

The wheel 1 is mounted on the circular portion 11 of the shaft 5, and when not clutched or the teeth 2 and 3 are out of engagement, does not revolve. The collar 8 and the sections 4 revolve continuously with the shaft 5, and the expansion of the sections 4 inside the wheel 1 by the end thrust or movement of the collar 8 causes the wheel 1 to become positively clutched to the shaft 5 by the engagement of the teeth 2 and 3 and to revolve therewith. Immediately the collar 8 is withdrawn from between the sections 4 and the shaft 5, the circular spring 6 draws the teeth 3 of the sections 4 clear of the inner teeth 2 of the wheel 1 and contracts the sections 4 around the shaft 5 again, permitting the latter to revolve, without revolving the wheel 1.

Figure 5:
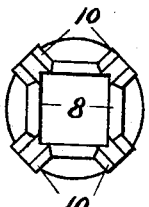
Fig. 5 shows the same collar in end view, without the key ways and adapted to work on a plain squared shaft.

The collar 8 is operated or given its end thrust or movement by any known means such as a fork 8ᵃ engaging in the groove 12, and may, if desired, be made to work on a plain flat sided shaft without the keys 9 as shown in Fig. 5.

Figure 6:
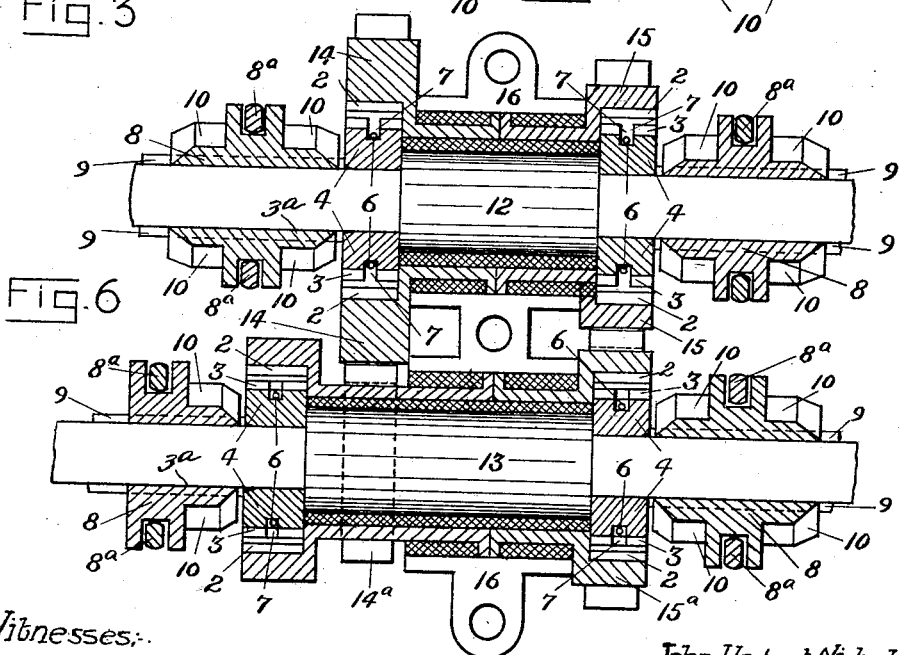
Fig. 6 shows by means of a sectional plan view how the invention is applied to a change speed gear box, as in general use.

In Fig. 6 the application of the invention to change speed gear is illustrated, two gears only being shown, 12 representing the power shaft to back axle and 13 the lay or countershaft. The wheels 14, 14ᵃ are the "low gear", and the wheels 15 and 15ᵃ the "second gear". The shafts 12 and 13 are flat sided except for their bearing surfaces inside the wheels 14 and 15, and 14ᵃ and 15ᵃ respectively, and the outer or end bearings. Central bearings 16 are provided for the wheels 14, 14ᵃ and 15, 15ᵃ which are thus supported externally as well as internally. Wheels 14, 15, and 15ᵃ have the inner teeth 2 formed therein and the radial toothed sections 4 fitted therein in the same way as in the wheel 1 in Figs. 1 and 2, but in the case of the wheel 14ᵃ which is of too small a diameter to permit of this being done, the clutching means are formed and operate in an extension of the wheel formed integral therewith. The collars 8 and the sections 4 engage and rotate with the flat sided portion 3ᵃ of the shafts, which when unclutched run freely inside the wheels 14, 15, 14ᵃ and 15ᵃ and the end bearings without rotating the gear wheels.

To cause one of the gears to be put into action, for instance the low gear wheels 14 and 14ᵃ, both the collars 8 adjacent to these wheels are actuated by the forks 8ᵃ to move in the direction indicated so as to simultaneously cause each wheel to be clutched to its respective shaft, by the expansion of the radial sections 4 as before described. Immediately the collars are withdrawn, the wheels 14 and 14ᵃ become stationary owing to the sections 4 again contracting around the shafts which continue rotating.

The wheels 15, 15ᵃ are brought into action by moving the adjacent collars 8 as indicated, the operation of clutching of the wheels to the shafts being as before stated.

In this case the collars 8 or any of them may be formed double ended or double acting so as to be capable of being moved in the reverse direction to operate other "gears" not shown.

Figure 7:
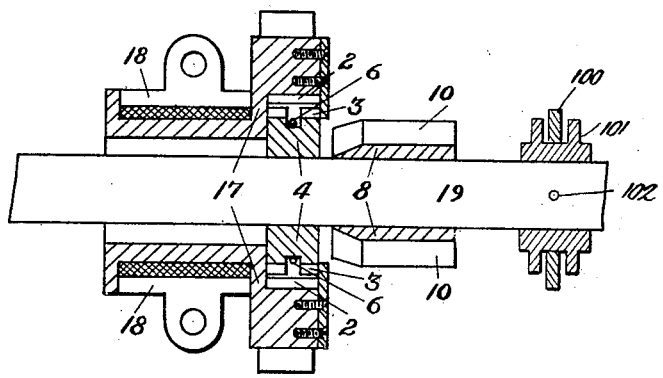
Fig. 7 is a sectional elevation of a gear wheel provided with a shaft adapted to be moved longitudinally through same, to operate the expanding clutching means.

The wheel 17 shown in Fig. 7 is mounted in a bearing 18 and has a flat sided shaft 19 running through same its ends being mounted in suitable bearings to allow of end thrust of the shaft. The collar 8 with the key shaped projections 10 therefrom is a fixture to the shaft 19, and to cause the clutching of the wheel 17 to the shaft 19, by the expansion of the toothed sections 4, the shaft itself is given lateral or end thrust to cause the collar 8 to force the sections 4 outward or to expand, and the teeth 2 and 3 to mesh with each other. The shaft may be moved longitudinally by a fork 100 engaging in a groove of a collar 101 which is secured to the shaft 19 by a pin 102. The unclutching of the wheel is brought about by moving the shaft in the reverse direction so as to permit of the sections 4 being again contracted around the shaft by the circular contracting spring 6. The collar 8 in this case can also be made double ended or double acting if necessary.

Figure 8:
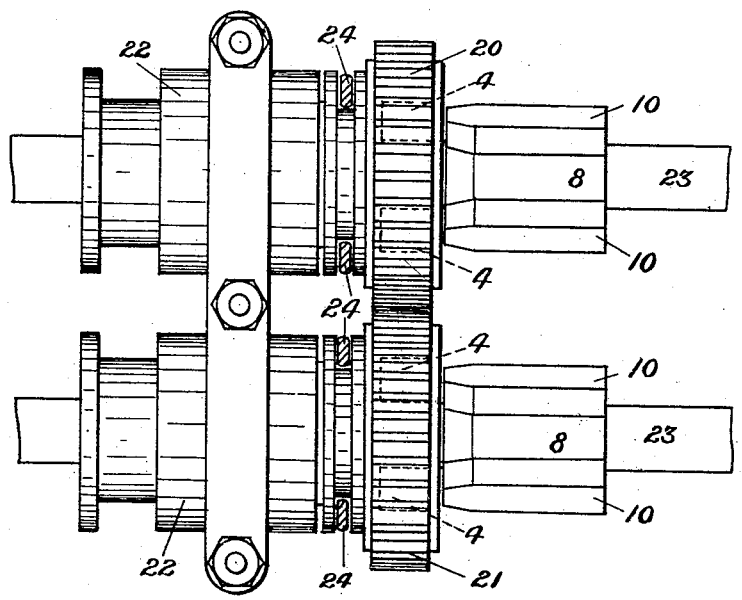
Fig. 8 is a plan view of a set of gear wheels adapted to be given simultaneous lateral movement, to clutch them to their respective shaft.

The pair of wheels 20, 21 illustrated in Fig. 8 are mounted in bearings 22, the shafts 23, with the fixed collars 8 thereon being mounted in end bearings and revolving freely inside of the wheels 20, 21 without imparting rotation thereto, when the wheels are unclutched or not in use. To bring the wheels 20, 21 into action or to clutch them to their shafts they are both simultaneously slid or moved in their bearings 22, by the forks 24 so as to cause the sections 4 (dotted) to ride up on top of the fixed collars 8 and so cause the required expansion necessary to cause the teeth 3 of the sections 4 to engage with the inner teeth 2 of the wheels, and as such expansion takes place in each wheel at the same time, both wheels are simultaneously clutched to their respective shaft. Simultaneous movement of the wheels in the reverse direction, permits the sections 4 to again contract around the shafts leaving the latter free to rotate while the wheels remain stationary or idle.

Figure 9:
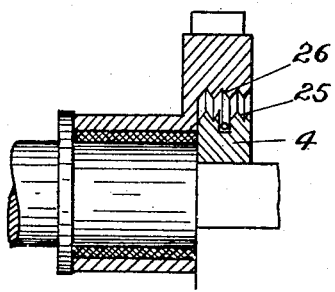
Fig. 9 is a sectional elevation of a segment of a wheel formed with grooved frictional gripping surfaces.

Fig. 9 illustrates how the radial sections 4 may be formed so as to render the clutch frictional gripping instead of positive gripping. The outer edges of the sections 4 are formed with projections 25 preferably V-shaped adapted to fit into corresponding circular grooves 26 internally of the wheel in place of the inner teeth 2, when the radial sections are expanded to clutch the wheel and shaft together.

The invention is particularly adapted for use with toothed gearing especially to change speed gears, as the different gears being always in mesh, the necessity of meshing toothed wheels running at different speeds is obviated, as the last mentioned operation is so often disastrous to the gear, besides creating considerable noise and causing jarring and jerking to take place. The clutch as hereinbefore described provides a positive or frictional gripping means between the shaft and wheel by means of the teeth or grooves on the quadrant pieces and the teeth or grooves in the wheel or pulley, the meshing of the two sets of teeth or grooves taking place while the wheel is stationary or nearly so, and the radial sections rotating with the shaft. The V-shaped or similarly formed teeth also tend to facilitate the meshing or the picking up of the stationary part by the rotating part. The invention is adaptable for use with any kind of wheel or pulley where a clutch is required, and when used in gear boxes considerably strengthens same by providing center bearings which insure rigidity and stability of the shafts, besides which the attendant noise and danger in changing the speed gears is obviated.

Having now fully described my invention, what I desire to claim and secure by Letters Patent is:—

1. In a clutch mechanism the combination of a driving shaft formed with flat surfaces, a driven element formed with internal teeth, radial sections formed with external teeth, means for normally maintaining said radial sections against the flat surfaces of the driving shaft, and a collar mounted on the driving shaft and formed with tapered projections adapted to engage between said radial sections and to expand same into toothed engagement with said driven element and lock said driven element and radial sections securely to said driving shaft.

2. In a clutch mechanism the combination of a driven member formed with internal teeth, a driving shaft formed with flat surfaces and passing freely through said driven member, externally toothed segments disposed within said driven member, a spring encircling said segments normally to maintain same in driving frictional engagement with the flat surfaces of said driving shaft and a collar mounted on the flat surfaced portion of the shaft and formed with tapering key-shaped projections adapted, upon relative movement between the collar and segments, to expand said segments into driving engagement with the driven member, by the meshing of the teeth on the segments with substantially all the teeth on the driven member and to lock the driven member and segments securely to both said collar and driving shaft, substantially as described.

JOHN HERBERT NICHOLLS.

Witnesses:
GEORGE WILLIAM BASLEY,
MARY CHRISTINA BRENNAN.

Copies of this patent may be obtained for five cents each, by addressing the "Commissioner of Patents, Washington, D. C."